US012586298B2

(12) United States Patent
Lev

(10) Patent No.: US 12,586,298 B2
(45) Date of Patent: Mar. 24, 2026

(54) CONTROLLED ILLUMINATION FOR IMPROVED 3D MODEL RECONSTRUCTION

(71) Applicant: NEC Corporation Of America, Herzlia (IL)

(72) Inventor: Tsvi Lev, Tel-Aviv (IL)

(73) Assignee: NEC Corporation Of America, Herzlia (IL)

( * ) Notice: Subject to any disclaimer, the term of this patent is extended or adjusted under 35 U.S.C. 154(b) by 234 days.

(21) Appl. No.: 18/105,941

(22) Filed: Feb. 6, 2023

(65) Prior Publication Data

US 2024/0265624 A1 Aug. 8, 2024

(51) Int. Cl.
| | |
|---|---|
| *G06T 15/50* | (2011.01) |
| *G06T 17/00* | (2006.01) |
| *G06V 10/60* | (2022.01) |
| *H04N 23/56* | (2023.01) |

(52) U.S. Cl.
CPC ............ *G06T 15/506* (2013.01); *G06T 17/00* (2013.01); *G06V 10/60* (2022.01); *H04N 23/56* (2023.01)

(58) Field of Classification Search
CPC ....... G06T 15/506; G06T 17/00; G06V 10/60; H04N 23/56
See application file for complete search history.

(56) References Cited

U.S. PATENT DOCUMENTS

| | | | | |
|---|---|---|---|---|
| 7,203,362 | B2 * | 4/2007 | Sato | G06T 5/20 382/164 |
| 10,484,617 | B1 * | 11/2019 | Colburn | H04N 23/64 |
| 11,860,098 | B1 * | 1/2024 | Li | G06V 10/141 |
| 2004/0076319 | A1 * | 4/2004 | Fauver | G01N 15/1468 382/133 |
| 2011/0116710 | A1 * | 5/2011 | Garg | G06T 5/77 382/173 |
| 2015/0256813 | A1 * | 9/2015 | Dal Mutto | H04N 25/134 348/47 |
| 2018/0047208 | A1 * | 2/2018 | Marin | H04N 13/257 |
| 2019/0208183 | A1 * | 7/2019 | Schmidt | G01S 17/894 |

OTHER PUBLICATIONS

M. Gerges and X. Chen, "Adaptive Lighting for Curved and Nonuniform Objects in Optomechanical Inspection Systems, " in IEEE/ASME Transactions on Mechatronics, vol. 27, No. 6, pp. 5792-5802, Dec. 2022, doi: 10.1109/TMECH.2022.3189344. (Year: 2022).*

Yoon J, Grigoroiu A, Bohndiek SE (2020) A background correction method to compensate illumination variation in hyperspectral imaging. PLoS One 15(3): e0229502. https://doi.org/10.1371/journal.pone.0229502 (Year: 2020).*

* cited by examiner

*Primary Examiner* — Daniel F Hajnik
*Assistant Examiner* — Chris Alejandro Puntier

(57) ABSTRACT

Disclosed herein is a method of improving computation of a 3 dimensional (3D) model of an object, comprising adjusting one or more illumination parameter of one or more light sources illuminating a target object having one or more high reflection surfaces, and operating one or more image sensors to capture a plurality of images depicting the target object from a plurality of different viewpoints while the object is illuminated by the one or more light sources. Wherein the plurality of images are used by one or more processors to compute a 3D model of the target object based on a plurality of features extracted from the plurality of images.

18 Claims, 5 Drawing Sheets

CONTROLLED ILLUMINATION FOR IMPROVED 3D MODEL RECONSTRUCTION

FIELD AND BACKGROUND OF THE INVENTION

The present invention, in some embodiments thereof, relates to improving computation of a 3 Dimensional (3D) model of an object, and, more specifically, but not exclusively, to improving computation of a 3D model of an object by controlling illumination of the object and thus improving visibility of the object and its features in the images which may be used to compute an improved 3D model of the object.

Creating a 3D model of an object based on images of the object is a process known as photogrammetry which involves using multiple images of an object taken from multiple different angles to create a 3D representation of that object.

The photogrammetry process typically involves acquisition of multiple images of the object different angles and perspectives (viewpoints), processing the images to align them to a common coordinate system and optionally remove distortion, noise, and/or artifacts, extracting features of the object from the images, matching feature extracted from different images and 3D reconstruction.

The 3D model reconstruction process may further comprise texturing of the final 3D model with information extracted from the images to give the final model a more realistic look.

SUMMARY OF THE INVENTION

According to a first aspect of the present invention there is provided a method of improving computation of a 3 dimensional (3D) model of an object, comprising using one or more processors for adjusting one or more illumination parameter of one or more light sources illuminating a target object having one or more high reflection surfaces, and operating one or more image sensors to capture a plurality of images depicting the target object from a plurality of different viewpoints while the object is illuminated by the one or more light sources. Wherein the plurality of images are used by one or more processors to compute a 3D model of the target object based on a plurality of features extracted from the plurality of images.

According to a second aspect of the present invention there is provided a system for improving computation of a 3 dimensional (3D) model of an object, comprising one or more processor configured to execute a code. The code comprising code instruction to adjust one or more illumination parameters of one or more light sources illuminating a target object. and code instruction to operate one or more image sensors to capture a plurality of images depicting the target object from a plurality of different viewpoints while the object is illuminated by the one or more light sources. Wherein the plurality of images are used by one or more processors to compute a 3D model of the target object based on a plurality of features extracted from the plurality of images.

According to a third aspect of the present invention there is provided a computer program product for improving computation of a 3 dimensional (3D) model of an object, comprising a non-transitory medium storing thereon computer program instructions which, when executed by one or more hardware processors cause the one or more hardware processors to adjust one or more illumination parameters of one or more light sources illuminating a target object, and operate one or more image sensors to capture a plurality of images depicting the target object from a plurality of different viewpoints while the object is illuminated by the one or more light sources. Wherein the plurality of images are used by one or more processors to compute a 3D model of the target object based on a plurality of features extracted from the plurality of images.

In a further implementation form of the first, second, and/or third aspects, one or more of the high reflection surfaces are identified based on analysis of one or more images depicting the target object.

In an optional implementation form of the first, second, and/or third aspects, one or more of the illumination parameters are adjusted based on one or more reflection effects of the target object identified in one or more of the plurality of images.

In a further implementation form of the first, second, and/or third aspects, one or more of the illumination parameters define one or more filtering parameters of one or more spectral filters deployed to filter out one or more reflecting spectral ranges of light illuminating the target object. The one or more reflecting spectral ranges are characterized by high reflection from the one or more high reflection surfaces.

In a further implementation form of the first, second, and/or third aspects, one or more illumination parameters define one or more lighting parameters of one or more of the light sources adapted to illuminate the target object in one or more illumination spectral ranges. The one or more lighting spectral ranges are characterized by low reflection from the one or more high reflection surfaces.

In a further implementation form of the first, second, and/or third aspects, one or more illumination spectral ranges deviate by more than a certain value from a background illumination of the target object.

In a further implementation form of the first, second, and/or third aspects, one or more of the image sensors are adapted to operate in the one or more illumination spectral ranges.

In a further implementation form of the first, second, and/or third aspects, one or more of the illumination spectral ranges are in Infrared (IR) spectral region.

In a further implementation form of the first, second, and/or third aspects, one or more of the illumination spectral ranges are in Ultraviolet (UV) spectral region.

In a further implementation form of the first, second, and/or third aspects, one or more of the illumination parameters define one or more timing parameters for one or more of the light sources adapted to illuminate the target object in a plurality of short light flashes having a time duration interval defined by one or more of the timing parameters.

In a further implementation form of the first, second, and/or third aspects, one or more of the illumination parameters define a lighting intensity of one or more of the light sources illuminating the target object.

In an optional implementation form of the first, second, and/or third aspects, one or more coherent light sources are operated to illuminate the target object.

In an optional implementation form of the first, second, and/or third aspects, one or more illumination parameters of one or more of a plurality of light sources illuminating the target object from a plurality of viewpoints are adjusted according to a position of the one or more light sources with respect to one or more of the image sensors.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
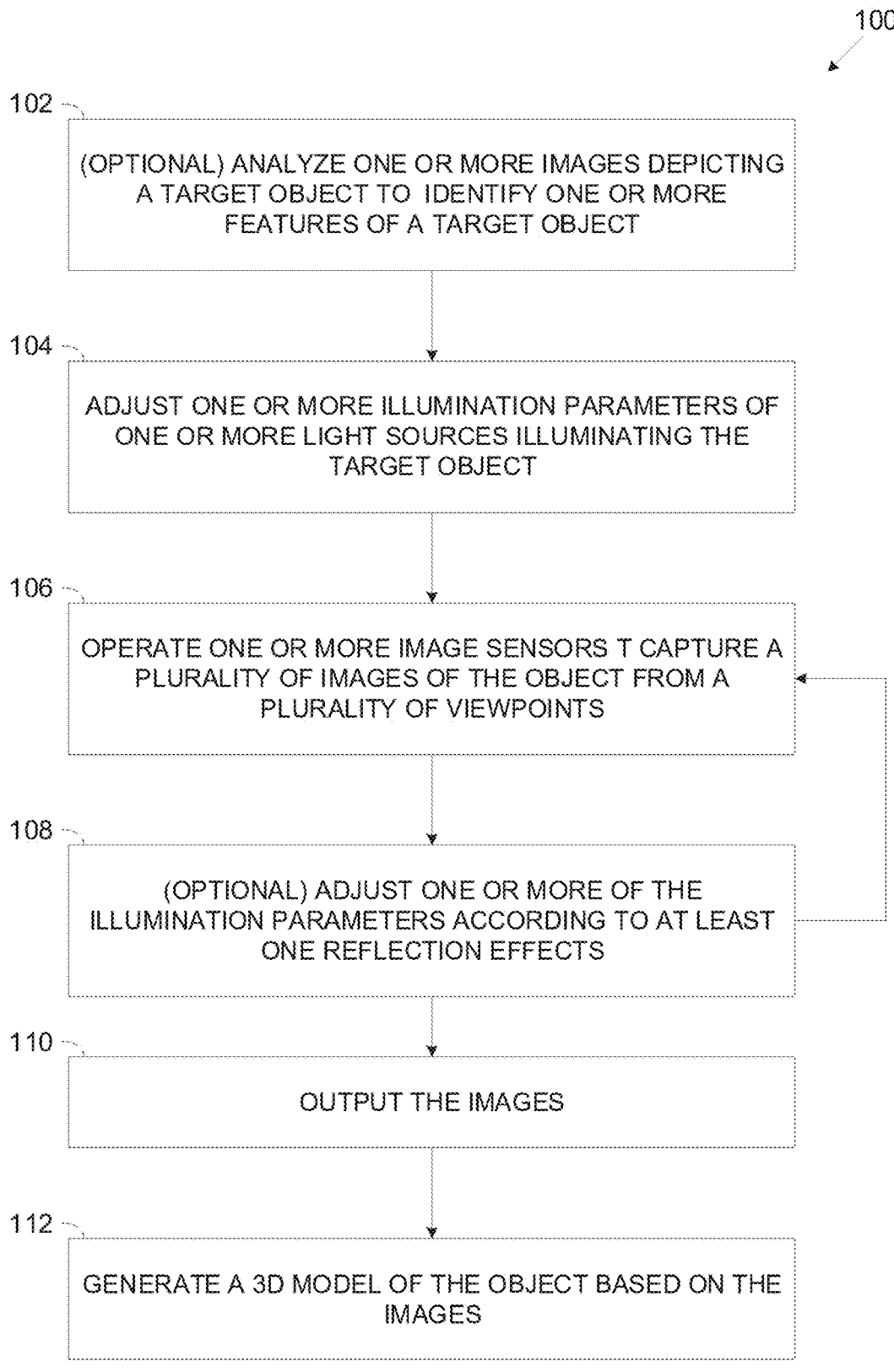
FIG. 1 is a flowchart of an exemplary process of improving computation of a 3D model of an object by controlling its illumination, according to some embodiments of the present invention.

The present invention, in some embodiments thereof, relates to improving computation of a 3D model of an object, and, more specifically, but not exclusively, to improving computation of a 3D model of an object by controlling illumination of the object and thus improving visibility of the object and its features in the images which may be used to compute an improved 3D model of the object.

Visibility of objects and their features may be highly degraded in images depicting the object due to one or more high reflection surfaces of the object which may reflect a significant portion of the light illuminating (hitting) the surface of the object. As such, since 3D model reconstruction heavily relies on matching corresponding feature in different images, specifically images captured from different viewpoints (angles), the 3D reconstructing may be significantly degraded in case the object features are not properly depicted in the images.

According to some embodiments of the present invention, there are provided methods, systems and computer program products for improving computation of 3D models of objects by improving visibility of the object and its features in images depicting the object from a plurality of different viewpoints (positions, angles) which are used to create the 3D model.

One or more light sources may be used to illuminate the object while it is imaged (photographed) from a plurality of viewpoints by one or more image sensors. Specifically, the light source(s) may be adapted to project (emit) light characterized by low reflection from surfaces of the target object, even from high reflection surfaces. Such low-reflection light may be typically projected in one or more spectral ranges which significantly deviate (e.g., in wavelength) from the visible light spectrum, for example, Infrared (IR) light, Ultraviolet (UV) light, and/or the like.

Additionally and/or alternatively, one or more filters, for example, spectral filters may be deployed to filter out light in one or more spectral ranges which is highly reflective from the object, for example, visible light range and/or part thereof.

One or more illumination parameters of the light source(s) and/or filtering parameters of the filters, collectively designated illumination parameters herein after, may be adjusted to control illumination of the object while the it is imaged by the image sensor(s) in order to improve visibility of the object and its features in the images and thus improve the 3D model created based on these images.

The illumination parameters may include, for example, a spectral range of the light projected by the light source(s) and/or passed by the filter(s). In another example, the illumination parameters may comprise an intensity of the light projected by the light source(s) or an amount of light passed/blocked by the filter(s). In another example, the illumination parameters may define ON/OFF state of one or more light sources and/or a pass/block state of one or more filters.

One or more light sources may be optionally adapted to illuminate the object with one or more light pulse sequences each comprising a plurality of short light flashes having a certain timing (ON/OFF timing) since illuminating the object with alternating light levels may significantly reduce reflection and improve visibility of the object and/its features in the captured images.

Optionally, one or more light sources may be coherent light sources adapted to illuminate the object with coherent light, for example, a focused laser beam which may be highly efficient for illuminating featureless and/or monotone surfaces having very limited features and potentially no features thus making it highly difficult to correlate such surfaces in different images. The coherent light sources may be also highly effective for illuminating textured surfaces which may look very different from different angles (viewpoints), for example, furry surface, hairy surface and/or the like.

The image sensors may be obviously adapted and/or operated according to the light sources and/or filters and the illumination parameters defining their operation. For example, assuming the illumination parameters of one or more light sensors define that the light sources illuminate the object in a certain spectral range, for example, IR, UV, and/or the like. In such case, the image sensors may be adapted to operate in the certain spectral range in which the object is well illuminated with the non-reflective light. In another example, assuming one or more light sources are adapted to project light pulse sequences according to a certain timing, the image sensors may be triggered to capture images according to the same certain timing.

Moreover, one or more of the light sources and/or filters may be operated and or have their illumination parameters adjusted according to their position (location) with respect to one or more of the image sensors to reduce and possibly eliminate specular reflection at the image sensors.

Optionally, one or more illumination parameters may be further adjusted for one or more light sources and/or filters according to one or more reflection effects identified in one or more of the images depicting the object, for example, high light reflection from one or more areas of the object, degraded visibility of one or more features of the object, and/or the like.

Controlling illumination of objects to reduce reflection from the object and thus increase its visibility in images used to create a 3D model of the object may present major advantages and benefits compared to currently existing methods and systems for imaging objects to create corresponding 3D models.

First, some of the existing 3D reconstruction methods rely on images of the object captured while the object is not illuminated by specific light sources and rely on background and/or environment lighting, for example, sunlight, light systems deployed on site, and/or the like projecting light in the visible light spectrum. Other existing 3D reconstruction methods and systems may use dedicated light sources which are also typically configured to emit light in the visible light spectral range.

Illuminating the object with light in the visible range may be highly limited since visible spectrum light is susceptible to major reflections from surfaces of the object, specially, mirror like surfaces, polished surfaces, metal surfaces and/or the like. The visible range light may also fail to properly illuminate objects comprising one or more self-light emitting elements, for example, screen, a LED, a flame, a fire, and/or the like since these elements may emit light primarily in the visible range.

In contrast, controlling illumination of the objects to illuminate them with low reflection light, specifically light in one or more low-reflection spectral ranges (IR, UV, etc.) which significantly deviate from the visible light spectral range, coupled with image sensors adapted to operate in these low reflection spectral ranges, may significantly reduce and possibly remove the reflection effects induced by the high reelection surfaces of the object. This is because reflection of the light in low-reflection spectral ranges (IR, UV, etc.) is mostly dependent on heat rather than on color which is the main factor affecting reflection of visible light and reflection of the light in low-reflection spectral ranges from the object is therefore significantly reduced. Moreover, as known in the art light in the low-reflection spectral ranges is much more absorbed by materials such as, for example, glass, metal, and/or the like which may reflect most of the visible light. Light in these low-reflection spectral ranges may be therefore much less reflected from such materials compared to visible light.

Reducing these reflection effects may significantly improve visibility of the object and its features, even the very fine features, in the images used to create the 3D model. The feature extraction and matching which is the fundamental element of 3D reconstruction may be therefore significantly improved compared to the existing methods resulting in high quality 3D models which are highly improved compared to the 3D models created by the existing methods, in terms of accuracy, reliability, veracity, and/or the like.

Moreover, since objects comprising self-light emitting elements typically emit light in the visible light spectrum, illuminating such objects with light in the low reflection spectral range(s) which deviate from the visible light spectral range may prevent visibility degradation typical to images of these objects captured in the visible light spectrum as may be done by the existing 3D reconstruction methods.

Furthermore, the light emitted by the self-light emitting elements of such objects, for example, a screen, a display and/or the like may dynamically vary and change thus further degrading visibility of the object and its features in images captured in the visible light range as may be done by the existing methods. By illuminating the objects with light that significantly deviates from the visible light range and using appropriate image sensors, the degraded visibility due to the effects of the dynamically varying self-light emitting elements may be significantly reduced and potentially completely removed.

In addition, illuminating the objects with light pulse sequences in which a plurality of light pulses are carefully and strictly timed with image capturing by the image sensors, may further remove shadows and/or reflection artifacts from the images thus significantly improving visibility of the objects and their very fine features which may highly benefit the feature based 3D reconstruct thus yielding high quality 3D models having improved accuracy, veracity, and/or reliability.

Also, using coherent light sources to illuminate the objects with a focused light beam may also significantly improve visibility of object features, which may seem very different from different viewpoints, compared to the existing methods which rely on wide angle light sources typically with no specific light sources at all. 3D reconstruction, which is based on matching the object's features identified in the images, may therefore significantly improve resulting in improved accuracy, veracity, and/or reliability 3D models.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer dis-kette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/process-ing devices from a computer readable storage medium or to an external computer or external storage device via a net-work, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-ar-chitecture (ISA) instructions, machine instructions, machine dependent instructions, microcode, firmware instructions, state-setting data, or either source code or object code written in any combination of one or more programming languages, including an object oriented programming lan-guage such as Smalltalk, C++ or the like, and conventional procedural programming languages, such as the "C" pro-gramming language or similar programming languages.

The computer readable program instructions may execute entirely on the user's computer, partly on the user's com-puter, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program prod-ucts according to embodiments of the invention. It will be understood that each block of the flowchart illustrations and/or block diagrams, and combinations of blocks in the flowchart illustrations and/or block diagrams, can be imple-mented by computer readable program instructions.

The flowchart and block diagrams in the Figures illustrate the architecture, functionality, and operation of possible implementations of systems, methods, and computer pro-gram products according to various embodiments of the present invention. In this regard, each block in the flowchart or block diagrams may represent a module, segment, or portion of instructions, which comprises one or more executable instructions for implementing the specified logi-cal function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block dia-grams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of improving computation of a 3D model of an object by controlling its illumination, according to some embodiments of the present invention.

An exemplary process 100 may be executed for control-ling illumination of a target object which is photographed (imaged) from a plurality of viewpoints around the object in order to create a 3D model of the object.

The illumination of the object may be controlled by adjusting one or more illumination parameters of one or more light sources illuminating the object in order to improve visibility of the object in images depicting the object which are used to create the 3D model. In particular, the illumination parameter(s) may be adjusted to counter visibility degradation of the object due to one or more high reflection surfaces of the object.

Controlling the illumination of the object to enhancing its visibility in images used to create a 3D model of the object may significantly improve the 3D model 212 in terms, of accuracy, veracity, integrity, and/or the like.

Reference is also made to FIG. 2A, FIG. 2B, FIG. 2C and FIG. 2D, which are schematic illustrations of exemplary embodiments of a system for improving computation of a 3D model of an object by controlling its illumination, according to some embodiments of the present invention.

An exemplary illumination system 200, for example, a computer, a server, a processing node, a cluster of computing nodes and/or the like may be configured to execute a process such as the process 100 for controlling its illumination of a target object 202 to enhance visibility of the object 202 in a plurality of images captured by one or more image sensors 204 which may be used to create a 3D model 212 of the object 202.

The object 202 may be practically any object which may be photographed by the image sensor(s) 204 from a plurality of viewpoints around the object 202 in order to capture images used to create a respective 3D model 212 of the object 202. As such the object 202 may span a wide range of objects such as, for example, handmade objects, such as, for example, structures, industrial artifacts, commercial products, art items, and/or the like as well as natural objects such as, for example, an inanimate, a plant, a living creature, and/or the like.

The 3D model 212 may comprise one or more computer graphics 3D models which may conform to one or more industry frameworks, standards, and/or tools, such as, for example, AutoCAD, SolidWorks, and/or the like. However, one or more physical models may be created for the object 202 using the generated 3D model 212, for example, a 3D drawing, a physical 3D model printed using a 3D printer, produced using a CNC machine, and/or the like.

Computing a 3D model such as the 212 based on imagery data of an object such as the object 202, specifically images depicting the object 202 from a plurality of viewpoints is out of scope of the present invention. Creating the 3D model 212 may be done using one or more methods, techniques, and/or algorithms as known in the art and/or as may become known in the future. Such 3D model generation methods may typically include image processing to remove distortion, noise, and to align the images to a common coordinate system, feature extraction to extract features of the object 202 from the images, feature matching to match corresponding features in different images, 3D reconstruction of the 3D model based on the matched features and their corresponding coordinates in the different images, and texturing the 3D model with information extracted from the images.

The illumination system 200 may include an Input/Output (I/O) interface 220, a processor(s) 222 for executing the process 100 and storage 224 for storing code (program store) and/or data.

The I/O interface 220 may further include one or more wired and/or wireless interconnections, ports, and/or interfaces, for example, a Universal Serial Bus (USB) interface, a serial port, a Controller Area Network (CAN) bus interface, a Radio Frequency (RF), a Wireless Local Area Network (WLAN) interface, and/or the like.

Via the I/O interface 220, the illumination system 200 may therefore connect to one or more of the image sensors 204 for controlling their operation, for example, trigger image capture, control capture parameters and/or timing, adjust a location of the image sensor(s) 204, and/or the like as well as receive the images captured by the image sensor (s) 204.

Via the I/O interface 220, the illumination system 200 may further control one or more light sources 206 illuminating the object 202 and/or one or more filters 216 filtering light to the object 202 in order to control the illumination of the object 202 while photographed by the image sensor(s) 204, i.e., while the image sensor(s) 204 capture images of the object 202 from a plurality of viewpoints.

The I/O interface 220 may further include one or more network interfaces for connecting to a network 208 comprising one or more wired and/or wireless networks, for example, a Local Area Network (LAN), a Wide Area Network (WAN), a Metropolitan Area Network (MAN), a cellular network, the internet and/or the like.

The processor(s) 222, homogenous or heterogeneous, may include one or more processing nodes arranged for parallel processing, as clusters and/or as one or more multi core processor(s). The storage 224 may include one or more persistent storage devices, for example, a Read Only Memory (ROM), a Non-volatile Memory (NVRAM), a hard drive, a Flash array and/or the like. The storage 224 may also include one or more volatile devices, for example, a Random Access Memory (RAM) component and/or the like. The storage 224 may further include one or more network storage resources, for example, a storage server, a Network Attached Storage (NAS), a network drive, and/or the like accessible via one or more networks through the I/O interface 220.

The processor(s) 222 may execute one or more software modules such as, for example, a process, a script, an application, an agent, a utility, a tool, an Operating System (OS) and/or the like each comprising a plurality of program instructions stored in a non-transitory medium (program store) such as the storage 224 and executed by one or more processors such as the processor(s) 222. The processor(s) 222 may optionally, integrate, utilize and/or facilitate one or more hardware elements (modules) integrated and/or utilized in the illumination system 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator and/or the like.

The processor(s) 222 may therefore execute one or more functional modules implemented using one or more software modules, one or more of the hardware modules and/or combination thereof. For example, the processor(s) 222 may execute an illumination engine 230 functional module for executing the process 100 to control illumination of the object 202. In particular, the illumination engine 230 may control the light source(s) 206, and/or the filter(s) 216 to control illumination of the object 202 and improve its visibility in the imagery data, i.e., the images captured by the image sensor(s) 204.

Optionally, the processor(s) 222 may further execute a modeling engine 232 functional module for creating the 3D model 212 based on the images captured by the image sensor(s) 204 to the depict the object 202 from a plurality of viewpoints. Optionally, the modeling engine 232 may be executed by one or more remote modeling systems 210, for example, a server, a computing node, a cluster of computing nodes, and/or the like communicatively coupled to the illumination system 200 via the network 208 to receive the imagery data, i.e., the images of the object 202 from the illumination system 200.

Optionally, the modeling engine 232, specifically, the modeling engine 232 may be utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud, Microsoft Azure, Amazon Web Service (AWS) and Elastic Compute Cloud (EC2), IBM Cloud, and/or the like.

The image sensor(s) 204, for example, a camera, a video camera, a depth camera, and/or the like may be operated to capture a plurality of images of the object 202. For example, a (stills) camera may be operated to capture a plurality of still images of the object 202. In another example, a video camera may be operated to capture one or more video streams of the object 202 from which a plurality of images (frames) may be extracted.

The image sensor(s) 204 may be adapted to operate in one or more spectral ranges. For example, one or more of the image sensor(s) 204 may be adapted to operate in to operate in visible light (400-700 nm). In another, one or more of the image sensor(s) 204 may be adapted to operate in to operate in one or more Infrared (IR) spectral ranges, for example, Near Infrared (NIR) (700-1000 nm), Short Wave Infrared (SWIR) (1000-3000 nm), and/or the like. In another, one or more of the image sensor(s) 204 may be adapted to operate in to operate in one or more Ultraviolet (UV) spectral ranges (10-400 nm). Optionally, one or more of the image sensor(s) 204 may be adopted to operate in multiple spectral ranges, for example, visible light and IR spectral range, in visible light, IR spectral range and UV spectral range, and or the like.

The light source(s) 206 may be adapted to employ one or more technologies, and/or techniques for illuminating the object 202.

For example, one or more of the light source(s) 206 may be adapted to illuminate the object 202 in one or more illumination spectral ranges, in particular, illumination spectral ranges which are characterized by low reflection from one or more high reflection surfaces of the object 202. Specifically, the illumination spectral range(s) of the light emitted by the light source(s) 206 may include one or more spectral ranges which significantly deviates from a background illumination of the object, for example, sunlight, lighting systems (lamps), and/or a combination therefore.

The illumination spectral ranges of the light projected by the light source(s) 216 may also deviate from the spectral range of the light which may be projected by the object 202 itself, for example, from one or more self-light emitting elements, for example, a screen, a lamp, a LED, and/or the like of an object 202 such as, for example, a TV set, a computer, a phone, an instrument, an appliance, an illumination body, a home accessory, a candle, a fireplace, and/or the like.

Such illumination spectral ranges may therefore include, for example, one or more of the IR spectral ranges (e.g., NIR, SWIR, etc.), the UV spectral range and/or part thereof, and/or the like which, as known in the art, tend to be significantly less reflected by objects, even objects having high reelection surfaces compared to the visible light.

The deviation of the light projected by light source(s) 206 from the background illumination may relate to one or more of the physical properties characteristic to the illumination spectral range(s) of the projected light, for example, the wavelength, the frequency and/or the like. The light projected by the light source(s) 206 from the background light may deviate from the background illumination of the target object 202 by more than a certain value, for example, by 20%, by 25%, by 30% and/or the like which may be sufficient for the image sensor(s) 204 to produce quality images in which visibility of the object 202 and its features is improved.

In another example, one or more of the light source(s) 206 may be adapted to illuminate the object 202 in a light pulse sequence comprising a plurality of short light flashes having a certain timing, i.e., each light pulse may be defined by a certain time duration interval (ON) followed by a certain no-light time duration interval (OFF). The light flashes may be high intensity pulses which may be timed with image capturing timing of the image sensor(s) 204 such that high quality images of the object 202 may be captured during the ON time in which visibility of the object 202 and its features is improved.

In another example, one or more of the light source(s) 206 may be adapted to project coherent light in one or more wavelengths, for example, a laser beam, and/or the like to illuminate the object 202 with a focused beam. Using a focused coherent light beam may be highly effective for illuminating objects 202 having one or more featureless and/or monotone surfaces and/or surfaces characterized by very small features, for example, hair like surfaces, furry surfaces, and/or the like which are difficult to correlate in images depicting the object 202 from different viewpoints.

Moreover, one or more of the light source(s) 206 may be controlled, for example, by the illumination system 200, specifically by the illumination engine 230. The illumination engine 230 may thus adjust one or more illumination parameters of one or more of the light source(s) 206. The illumination parameters may define and control operation of one or more of the light source(s) 206 and/or one or more lighting parameters of the respective light source 206. For example, one or more of the illumination parameters may define an ON/OFF state of a respective light source 206. In another example, one or more of the illumination parameters may define one or more illumination spectral ranges for the light projected by a respective light source 206. In another example, one or more of the illumination parameters may define the timing for a pulse sequence projected by a respective light source 206, for example, a ON time interval, an OFF time interval and/or the like, a number of light flashes and/or the like.

The illumination parameters may further define and control a location of the one or more dynamic light sources 206 which are dynamically moveable with respect to the object 202.

The filter(s) 216 may be also used to control the illumination of the object 202 while imaged by the image se sensor(s) 204 to improve visibility of the object 202 and its features in the images captured by the image sensor(s) 204. One or more of the filter(s) 206 may be used to filter the background light illuminating the object 202, for example, sunlight, lighting systems (lamps), and/or a combination therefore. However, one or more of the filter(s) 206 may be used in conjunction with one or more of the light source(s) 206 to filter the light projected by the light source(s) 206.

The filter(s) 216 may be adapted to apply one or more filtering techniques. For example, one or more of the filter(s) 216 may comprise one or more spectral filters adapted to filter out one or more spectral ranges (wavelengths) of the light illuminating the object 202 thus selecting the spectral range of the light which passes through to illuminate the object 202. In particular, the spectral filter(s) 216 may be adapted to filter out one or more reflecting spectral ranges of light illuminating the target object, for example, visible light spectrum and/or part thereof which is characterized by high reflection from the high reflection surface(s) of the object 202.

In another example, one or more of the filter(s) 216 may be adapted to reduce and/or increase intensity of the light illuminating the object 202. In another example, one or more of the filter(s) 216 may be adapted to at least partially block the light illuminating the object 202. Moreover, the one or more of the filter(s) 216 may be adapted to block and pass the light to the object 202 according to a certain timing. For example, the filter(s) 216 may be adapted to project a plurality of light flashes illuminating the object 202 by alternatingly blocking and passing light to the object 202.

Moreover, one or more of the filter(s) 216 may be controlled, for example, by the illumination system 200, specifically by the illumination engine 230. As such, the illumination engine 230 may adjust one or more illumination parameters, specifically filtering parameters of one or more of the filter(s) 216. The illumination parameters may therefore comprise one or more filtering parameters defining and controlling operation of one or more of the filter(s) 216 and/or one or more operational parameters of the respective filter 216. For example, one or more of the filtering parameters may define a pass or at least partially block light going through a respective filter 216. In another example, one or more of the filtering parameters may define passing or at least partially blocking one or more illumination spectral ranges of light going through a respective filter 216. In another example, one or more of the illumination parameters may define a timing for passing and at least partially blocking light going through a respective filter 216.

The filtering parameters may further define and control a location of the one or more dynamic filters 216 which are dynamically moveable with respect to the object 202.

A plurality of architectures, deployments and/or configurations may be applied for the image sensor(s) 204, the light source(s) 206 and/or the filter(s) 216 to effectively illuminate the object 202 and capture images depicting the object 202 from a plurality of viewpoints which may be essential for creating a high quality, high veracity and/or accurate 3D model 212.

Figure 2A:
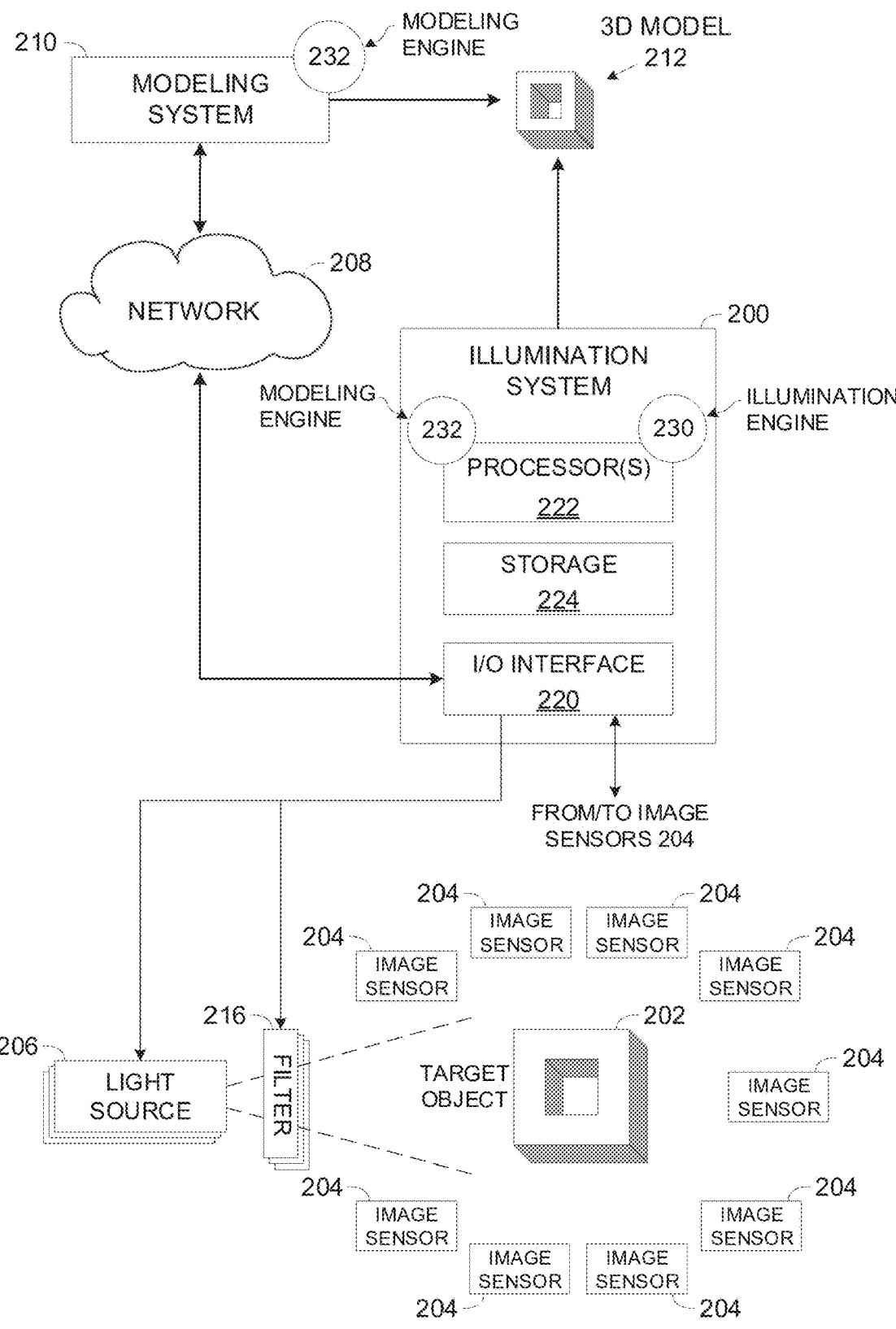
FIG. 2A, FIG. 2B, FIG. 2C and FIG. 2D are schematic illustrations of exemplary embodiments of a system for improving computation of a 3D model of an object by controlling its illumination, according to some embodiments of the present invention.

For example, as seen in FIG. 2A, a plurality of image sensors 204 may be statically (fixedly) deployed around the object 202 such that each image sensor 204 may capture one or more images depicting the object 202 from a respective viewpoint. One or more light sources 206 and/or filters 216 may be statically deployed in one or more locations around the object 202 to control illumination of the object 202 while imaged by the plurality of image sensors 204.

Figure 2B:
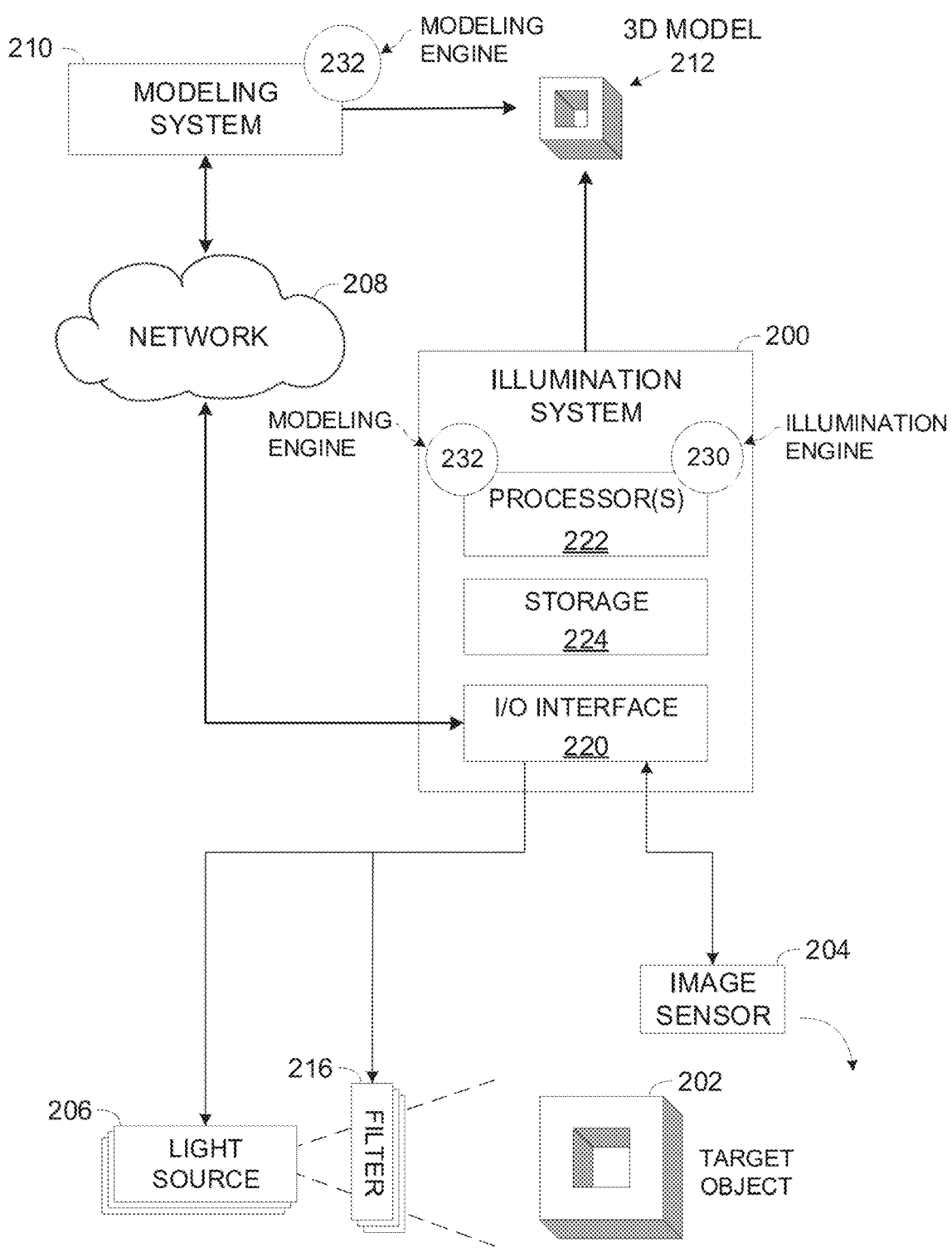

In another example, as seen in FIG. 2B, one or more image sensors 204 may be dynamically movable around the object 202. The moveable image sensor(s) 204 may be therefore operated, for example, by the illumination engine 230, to move and capture a plurality of images depicting the object 202 from a plurality of viewpoints. One or more light sources 206 and/or filters 216 may be statically deployed in one or more locations around the object 202 to control illumination of the object 202 while imaged by the dynamically moving image sensor(s) 204.

Figure 2C:
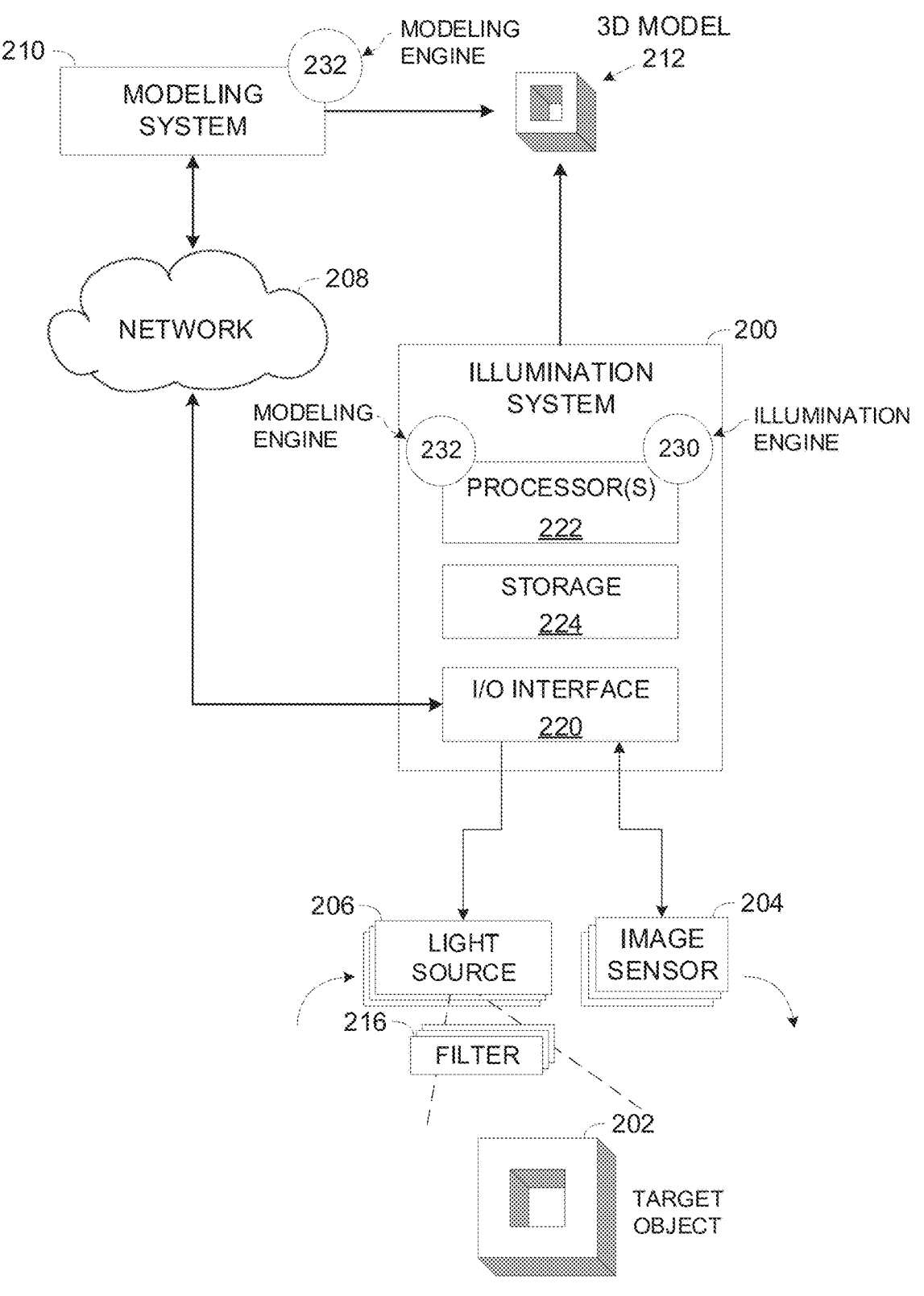

In another example, as seen in FIG. 2C, one or more image sensors 204 may be dynamically movable around the object 202. One or more light sources 206 and/or filters 216 may be also dynamically movable around the object 202. The moveable image sensor(s) 204 and the light sources 206 and/or filters 216 may be therefore operated, optionally in a synchronized manner, for example, by the illumination engine 230, such that the moving image sensor(s) 204 may capture a plurality of images depicting the object 202 from a plurality of viewpoints while illuminated by the moving light sources 206 and/or filters 216.

Figure 2D:
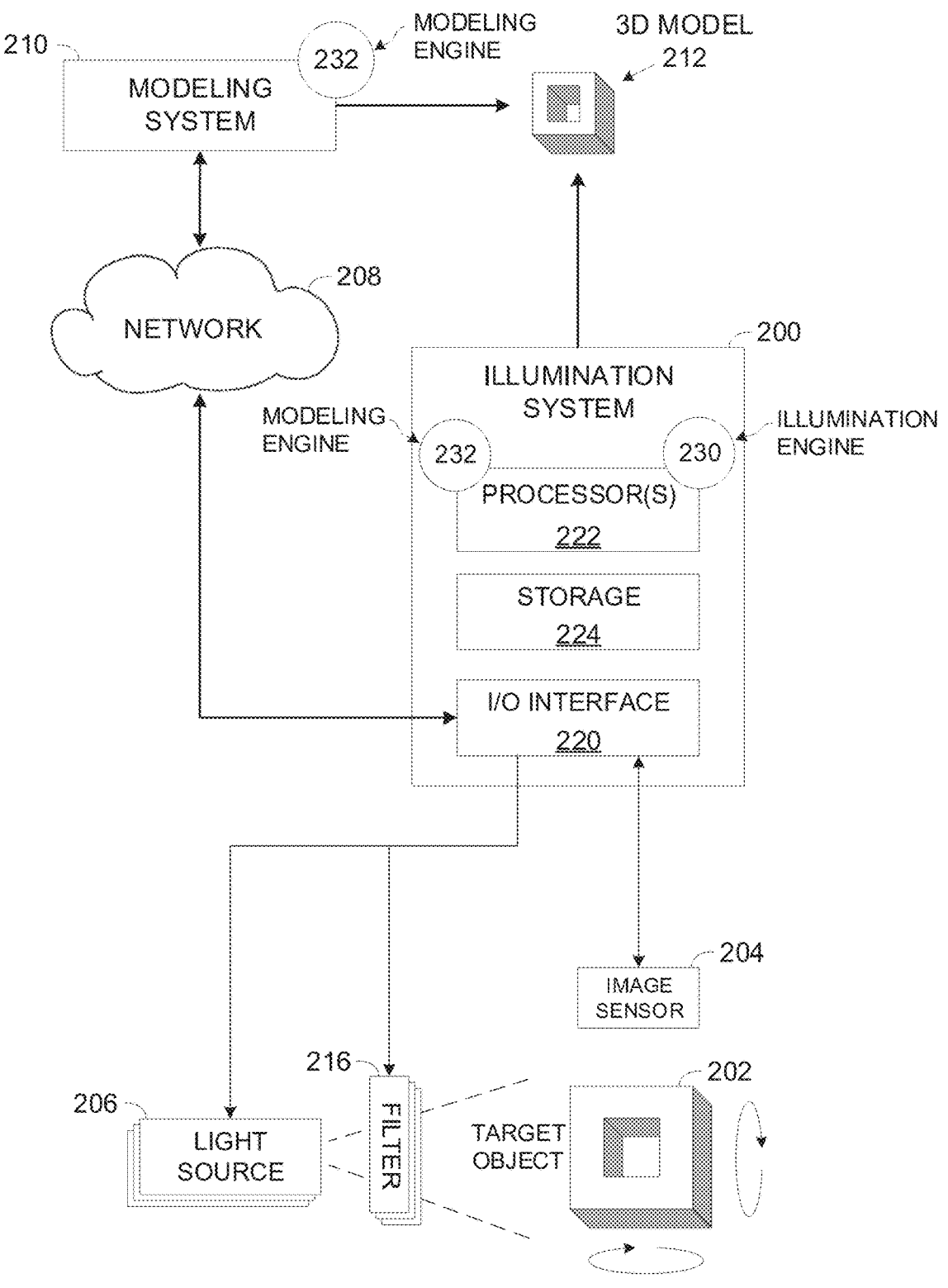

In another example, as seen in FIG. 2D, one or more image sensors 204 may be statically deployed in one or more locations around the object 202 to image the object 202. One or more sources 206 and/or filters 216 may be also statically deployed in one or more locations around the object 202 to control illumination of the object 202 while imaged by the plurality of image sensors 204. The object 202 itself may be dynamically moveable, for example rotated around one or more axes. The illumination engine 230 may therefore operate the static image sensor(s) 204 to capture a plurality of images of the rotating object 202 from a plurality of viewpoints.

One or more of the deployments of the image sensor(s) 204, light source(s) 206 and/or filter(s) 216 demonstrated in FIG. 2A, FIG. 2B, FIG. 2C and FIG. 2D may be combined and/or interchanged such that one or more of the image sensor(s) 204, the light source(s) 206, the filter(s) 216 and/or the object 202 itself may be statically fixated in place and/or dynamically moveable. Moreover, the deployments described herein should not be construed as limiting, since, as may become apparent to a person skilled in the art, other deployments, architectures, and/or configurations may be applied for capturing images of the object 202 from a plurality of viewpoints.

For brevity, the process 100 executed by the illumination engine 230 is described for controlling illumination of a single object 202 to improve the imagery data (images) depicting the object and thus improving the 3D model 212 created for the object 202 based on the captured imagery data. This, however, should not be construed as limiting since the process 100 may be scaled and expanded for controlling illumination of a plurality of objects such as the object 202 either photographed (imaged) separately or together.

As shown at 102, which is an optional step, the process 100 may start with the illumination engine 230 analyzing one or more images depicting the object 202 to identify one or more features of the target object 202.

The illumination engine 230 may apply one or more methods, techniques, and/or algorithms as known in the art to analyze the images captured by the image sensor(s) 204, for example, computer vision, image processing, a classifier, a neural network, a Support Vector Machine (SVM), and/or the like.

For example, the illumination engine 230 may analyze the images to identify one or more high reflection surfaces of the object 202 which may reflect and/or emit significant light (level) which may potentially degrade quality, accuracy, and/or veracity of the object 202 in one or more images captured to image the object 202. The high reflection surfaces may comprise one or more surfaces, for example, a polished surface, a mirror like surface, a surface made of high reflective material, and/or the like which may reflect a lot of light projected on the object 202. In another example, the high reflection surfaces may one or more self-light emitting elements which project light from the object 202 itself which may degrade quality, accuracy, and/or veracity of the object 202 in the images.

In another example, the illumination engine 230 may analyze the images to identify a texture, a pattern, a protrusion, a depression, and/or the like a one or more surfaces of the object 202 which may reflect light and/or otherwise degrade visibility of the object 202 in one or more images depicting the object 202 from one or more viewpoints.

As shown at 104, the illumination engine 230 may adjust one or more illumination parameters of one or more of the light source(s) 206 illuminating the target object 202 which may have one or more high reflection surfaces. Additionally, and/or alternatively, the illumination engine 230 may adjust one or more filtering parameters of one or more of the filter(s) 216 controlling passage of light to the target object 202.

For brevity, the illumination parameter(s) of the light source(s) 206 and the filtering parameter(s) of the filter(s) 216 is collectively designated illumination parameter(s) herein after.

The illumination engine 230 may adjust the illumination parameter(s) regardless of whether the object 202 has high reflection surfaces, where these surfaces are located and/or reflection effects and/or properties of such high reflection surfaces. This means that the illumination engine 230 may adjust the illumination parameter(s) of the light source(s) 206 and/or of the filter(s) 216 to overcome effects of background and/or self-emitting light in general in order to improve visibility of the object 202 in one or more images captured to depict the object 202 from a plurality of viewpoints.

For example, the illumination engine 230 may adjust the illumination parameter(s) of one or more light sources 206 and/or of one or more filters 216 to illuminate the object 206 with light in one or more of the spectral ranges deviating from typical background light and/or self-emitted light, for example, light in the IR spectral range, light in the UN spectral range, and/or the like.

In another example, the illumination engine 230 may adjust the illumination parameter(s) of one or more light sources 206 and/or of one or more filters 216 and operate accordingly one or more of the image sensors 204. For example, assuming the light source(s) 206 and/or the filter(s) 216 are configured to illuminate and/or pass, respectively, light in an IR spectral range, the illumination engine 230 may configure and operate one or more of the image sensors 204 ion the same IR spectral range.

In another example, assuming one or more of the image sensors 204, the light sources 206 and/or the filters 216 are dynamically moveable with respect to the object 202. In such case, the illumination engine 230 may coordinate and/or synchronize the movement, the illumination timing of the light sources 206 and/or the filters 216, the capture timing of the image sensor(s) 204, and/or the like to control the image sensor(s) 204 to capture images of the object 202 while properly illuminated using the light sources 206 and/or the filters 216.

However, the illumination engine 230 may adjust the illumination parameter(s) of one or more light sources 206 and/or of one or more filters 216 based on the features of the object 202 identified based on the analysis of the images in step 102.

For example, assuming that based on the analysis of the images, the illumination engine 230 identifies a certain high reflection surface on the object 202. In such case, the illumination engine 230 may adjust one or more of the illumination parameters of one or more of the light sources 206 and/or filters 216 which are positioned to illuminate the certain high reflection surface.

In another example, assuming that based on the analysis of the images, the illumination engine 230 identifies a protrusion or a depression in the object 202 which may induce and/or cast shadow on one or more features of the object 202. In such case, the illumination engine 230 may adjust one or more of the illumination parameters of one or more of the light sources 206, for example, adjust light intensity, adjust position (location), and/or the like to reduce shadows induced by the identified protrusion or depression.

In another example, assuming that based on the analysis of the images, the illumination engine 230 identifies a hairy surface and/or furry surface which may not be accurately and/or consistently visible even when well illuminated. In such case, the illumination engine 230 may adjust one or more of the illumination parameters defining a certain timing for one or more light pulse sequences generated by one or more of the light sources 206 configured to project such light pulse sequences. In a another example, the illumination engine 230 may adjust one or more of the illumination parameters defining projection of one or more coherent light beams projected by one or more of the light sources 206 configured to project such coherent light.

As shown at 106, the illumination engine 230 may operate one or more of the image sensor(s) 204 to capture a plurality of images depicting the target object 202 from a plurality of different viewpoints while the object 202 is illuminated by light projected by one or more of the light source(s) 206 and/or by light filtered by one or more of the filter(s) 216.

For example, the illumination engine 230 may trigger image capturing by one or more of the image sensor(s) 204 while the object 202 is illuminated by light projected by one or more of the light source(s) 206 and/or by light filtered by one or more of the filter(s) 216. In another example, the illumination engine 230 may adjust position (location) of one or more dynamically moveable image sensor(s) 204 to capture images of the object 202 depicting it from a plurality of different viewpoints.

As described hereon before, the illumination engine 230 may operate one or more of the image sensor(s) 204 in a coordinated and/or synchronized manner with the operation of the light source(s) 206 and/or filter(s) 216 as defined by the illumination parameters. For example, assuming the illumination engine 230 adjusts the illumination parameters of one or more light source(s) 206 and/or filter(s) 216 to project light in the IR spectral range, the illumination engine 230 may operate one or more image sensors 204 to capture one or more images of the object 202 in the IR spectral range. In another example, assuming the illumination engine 230 adjusts the illumination parameters of one or more light source(s) 206 to project one or more light pulse sequences according to a certain timing, the illumination engine 230 may operate one or more image sensors 204 to capture images of the object 202 according to the same timing, or slightly lagging the certain timing to account for power-up time of the light source(s) 206 and the object 202 is already properly illuminated when the images are captured.

In another example, assuming a plurality of light source(s) 206 and/or filter(s) 216 are deployed around the object 202 to control illumination of the object 202 from a plurality of viewpoints. In such case, the illumination engine 230 may adjust one or more of the illumination parameters of one or more of the light sources 206 and/or filters 216 according to the position (location) of one or more of image sensor(s) 204 to reduce and potentially eliminate specular reflection at the image sensor(s) 204.

the object 202 the illumination engine 230 may operate one or more of the image sensor(s) 204 in a coordinated and/or synchronized manner with the operation of the light source(s) 206 and/or filter(s) 216 as defined by the illumination parameters As shown at 108, which is an optional step, the illumination engine 230 may further adjust one or more of the illumination parameters of one or more of the light sources 206 and/or filters 216 according to one or more reflection effects identified based on analysis of one or more images captured by one or more of the image sensor(s) 204.

For example, assuming that based on analysis of images captured by an image sensor 204, the illumination engine 230 identifies significant light reflection from one or more high reflection surfaces of the object 202 which may potentially degrade the visibility of the object 202 in the images, the illumination engine 230 may adjust one or more illumination parameters to reduce and possibly eliminate the light reflection. For example, the illumination engine 230 may adjust a position (location) of one or more of the light sources 206 and/or filters 216 with respect to the object 202 and/or with respect to one or more of the image sensors 204 such that light reflected from the high reflection surface(s) of the object 202 are deflected away from the image sensor(s) 204. In another example, the illumination engine 230 may adjust one or more illumination parameters to define a different spectral range for the light projected by one or more of the light sources 206 and/or filters 216 which may be less reflected by the high reflection surface(s) of the object 202.

As shown at 110, the illumination engine 230 may output the images (imagery data) captured by the image sensor(s) to depict the object 202 from the plurality of viewpoints.

In particular, the illumination engine 230 may provide the images of the object 202 to one or more engines such as the modeling engine 232 adapted to create the 3D model 212 of the object 202 based on the images depicting the object 202 from the plurality of viewpoints. For example, assuming the modeling engine 232 is executed by the illumination system 200, the illumination engine 230 may provide the images of the object 202 to the locally executed modeling engine 232 via one or more system calls, one or more Application Programming Interface (API) functions, one or more application data transfer routines and/or the like. In another example, the illumination engine 230 may store the images of the object 202 in memory, for example, the local storage 224 and/or a remote storage accessible via the network 208, from which the images may be fetched by the locally executed modeling engine 232.

Assuming the modeling engine 232 is executed remotely by the modeling system 210, the illumination engine 230 may transmit the images of the object 202 to the modeling system 210 via the network 208. Additionally, and/or alternatively, the illumination engine 230 may store the images in one or more remote storage resources accessible via the network 208 from which the images may be fetched by the remotely executed modeling engine 232.

As shown at 112, the modeling engine 232 may generate a 3D model 212 of the object 202 based on the images depicting the object 202 from the plurality of viewpoints. For example, the modeling engine 232 may generate one or more computer graphics 3D models 212 which may conform to one or more industry frameworks, standards, and/or tools, such as, for example, AutoCAD, SolidWorks, and/or the like. Optionally, one or more physical models may be created for the object 202 using the generated 3D model 212, for example, a 3D drawing, a physical 3D model printed using a 3D printer, produced using a CNC machine, and/or the like. As stated herein before, creating the 3D model 212 based on imagery data of the object 202 may be done as known in the art and is not in the scope of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms image sensor, and light source are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of improving computation of a 3 dimensional (3D) model of an object, comprising:

using at least one processor for:

analyzing one or more preliminary images depicting a target object to detect regions exhibiting high reflection characteristics;

identifying, through said analysis, at least one high reflection surface that produces reflection effects that interfere with computation of said 3D model;

adjusting, based on said analysis, at least one illumination parameter of at least one light source illuminating said target object, so as to reduce or eliminate said reflection effects from said at least one high reflection surface, prior to capturing final modelling images, when illuminated by said at least one light source, wherein the at least one illumination parameter defines at least one lighting parameter of the at least one light source adapted to illuminate the target object in at least one illumination spectral range, the at least one lighting spectral range is characterized by low reflection from the at least one high reflection surface;

operating at least one image sensor to capture a plurality of images depicting the target object from a plurality of different viewpoints while the object is illuminated by the adjusted at least one light source; and using the plurality of images to compute, by said at least one processor, a 3D model of the target object based on a plurality of features extracted from the plurality of images.

2. The method of claim 1, wherein said reflection effects are identified in at least one of the plurality of images.

3. The method of claim 1, wherein the at least one illumination parameter defines at least one filtering parameter of at least one spectral filter deployed to filter out at least one reflecting spectral range of light illuminating the target object, the at least one reflecting spectral range is characterized by high reflection from the at least one high reflection surface.

4. The method of claim 1, wherein the at least one illumination spectral range deviates by more than a certain value from a background illumination of the target object.

5. The method of claim 1, wherein the at least one image sensor is adapted to operate in the at least one illumination spectral range.

6. The method of claim 1, wherein the at least one illumination spectral range is in Infrared (IR) spectral region.

7. The method of claim 1, wherein the at least one illumination spectral range is in Ultraviolet (UV) spectral region.

8. The method of claim 1, wherein the at least one illumination parameter defines at least one timing parameter for the at least one light source adapted to illuminate the target object in a plurality of short light flashes having a time duration interval defined by the at least one timing parameter.

9. The method of claim 1, wherein the at least one illumination parameter defines a lighting intensity of the at least one light source illuminating the target object.

10. The method of claim 1, further comprising operating at least one coherent light source to illuminate the target object.

11. The method of claim 1, further comprising adjusting the at least one illumination parameter of at least one of a plurality of light sources illuminating the target object from a plurality of viewpoints according to a position of the at least one light source with respect to the at least one image sensor.

12. The method of claim 1, wherein said reflection effects interfere with extraction of said plurality of features from said plurality of images, and wherein reducing or eliminating said reflection effects improves accuracy of said feature extraction.

13. The method of claim 1, wherein said adjusting occurs during capture of said plurality of images to improve said computation of said 3D model.

14. The method of claim 1, wherein said reflection effects interfere with matching of corresponding features between different images of said plurality of images, and wherein reducing or eliminating said reflection effects improves said matching to enhance accuracy of said 3D model computation.

15. The method of claim 14, wherein said adjusting occurs during capture of said plurality of images to prevent said reflection effects from degrading said feature matching.

16. The method of claim 1, wherein said at least one high reflection surface comprises a surface that reflects visible light spectrum illumination in a manner that obscures object features needed for said 3D model computation.

17. A system for improving computation of a 3 dimensional (3D) model of an object, comprising:

at least one processor configured to execute a code, the code comprising:

code instructions to analyze one or more preliminary images depicting a target object to detect regions exhibiting high reflection characteristics;

code instructions to identify, through said analysis, at least one high reflection surface that produces reflection effects that interfere with computation of said 3D model;

code instruction to adjust, based on said analysis, at least one illumination parameter of at least one light source illuminating said target object, so as to reduce or eliminate said reflection effects from said at least one high reflection surface, prior to capturing final modelling images, when illuminated by said at least one light source, wherein the at least one illumination parameter defines at least one lighting parameter of the at least one light source adapted to illuminate the target object in at least one illumination spectral range, the at least one lighting spectral range is characterized by low reflection from the at least one high reflection surface;

code instruction to operate at least one image sensor to capture a plurality of images depicting the target object from a plurality of different viewpoints while the object is illuminated by the adjusted at least one light source; and code instruction to use the plurality of images to compute, by said at least one processor, a 3D model of the target object based on a plurality of features extracted from the plurality of images.

18. A computer program product for improving computation of a 3 dimensional (3D) model of an object, comprising a non-transitory medium storing thereon computer program instructions which, when executed by at least one hardware processor cause the at least one hardware processor to:

analyze one or more preliminary images depicting a target object to detect regions exhibiting high reflection characteristics;

identify, through said analysis, at least one high reflection surface that produces reflection effects that interfere with computation of said 3D model;

adjust, based on said analysis, at least one illumination parameter of said at least one light source illuminating said target object, so as to reduce or eliminate said reflection effects from said at least one high reflection surface, prior to capturing final modelling images, when illuminated by said at least one light source, wherein the at least one illumination parameter defines at least one lighting parameter of the at least one light source adapted to illuminate the target object in at least one illumination spectral range, the at least one lighting spectral range is characterized by low reflection from the at least one high reflection surface;

operate at least one image sensor to capture a plurality of images depicting the target object from a plurality of different viewpoints while the object is illuminated by the adjusted at least one light source; and use the plurality of images to compute, by said at least one processor, a 3D model of the target object based on a plurality of features extracted from the plurality of images.

* * * * *